(12) United States Patent
Wang

(10) Patent No.: US 12,101,757 B2
(45) Date of Patent: Sep. 24, 2024

(54) METHOD FOR OBTAINING TRANSMISSION RECEPTION POINT INFORMATION, USER TERMINAL, AND READABLE STORAGE MEDIUM

(71) Applicant: BEIJING UNISOC COMMUNICATIONS TECHNOLOGY CO., LTD., Beijing (CN)

(72) Inventor: Hualei Wang, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 596 days.

(21) Appl. No.: 17/289,707

(22) PCT Filed: Oct. 24, 2019

(86) PCT No.: PCT/CN2019/112907
§ 371 (c)(1),
(2) Date: Apr. 28, 2021

(87) PCT Pub. No.: WO2020/088334
PCT Pub. Date: May 7, 2020

(65) Prior Publication Data
US 2022/0007387 A1    Jan. 6, 2022

(30) Foreign Application Priority Data
Nov. 1, 2018   (CN) .......................... 201811294289.7

(51) Int. Cl.
*H04W 72/23* (2023.01)
*H04L 5/00* (2006.01)
*H04W 72/1263* (2023.01)

(52) U.S. Cl.
CPC ....... *H04W 72/1263* (2013.01); *H04L 5/0051* (2013.01); *H04W 72/23* (2023.01)

(58) Field of Classification Search
None
See application file for complete search history.

(56) References Cited

U.S. PATENT DOCUMENTS

2019/0297603 A1* 9/2019 Guo ...................... H04L 5/0053
2019/0379506 A1* 12/2019 Cheng ................... H04L 1/0038
(Continued)

FOREIGN PATENT DOCUMENTS

| CN | 108199819 A | 6/2018 |
|---|---|---|
| CN | 108206714 A | 6/2018 |
| WO | WO-2018190617 A1 | 10/2018 |

OTHER PUBLICATIONS

Spreadtrum Communications. "Discussion on Multi-TRP transmission" 3GPP TSG WG1 Meeting #94bis R1-164297, Oct. 8-12, 2018 (Oct. 8, 2018)(5 pages).

(Continued)

*Primary Examiner* — Duc T Duong
(74) *Attorney, Agent, or Firm* — Harness, Dickey & Pierce, P.L.C.

(57) ABSTRACT

A method for obtaining transmission reception point (TRP) information, a user terminal, and a readable storage medium. The method comprises: receiving control information, the control information being suitable for triggering a signal or a channel; obtaining TCI comprised in the control information; and obtaining, according to the TCI, a TRP that participates in transmitting a signal or a channel triggered by the control information. The solution above can implement dynamic switching between a single TRP transmission scheme and a multi-TRP transmission scheme.

8 Claims, 2 Drawing Sheets

```
receiving a control information                                    ─ S101 obtaining a Transmission Configuration Indication (TCI) comprised in the
                    control information                            ─ S102 obtaining, according to the TCI, a TRP which participates in transmitting the
    signal or the channel triggered by the control information     ─ S103
```

(56) References Cited

U.S. PATENT DOCUMENTS

| | | | | |
|---|---|---|---|---|
| 2020/0037305 | A1* | 1/2020 | Yang | H04L 5/0035 |
| 2020/0077369 | A1* | 3/2020 | Zhang | H04L 5/0053 |
| 2020/0092860 | A1* | 3/2020 | Khoshnevisan | H04W 76/27 |
| 2020/0100193 | A1* | 3/2020 | Cheng | H04W 52/146 |
| 2020/0100277 | A1* | 3/2020 | Khoshnevisan | H04W 72/1273 |
| 2021/0084623 | A1 | 3/2021 | Zhang et al. | |

OTHER PUBLICATIONS

International Search Report (English and Chinese) and Written Opinion (Chinese) of the International Searching Authority issued in PCT/CN2019/112907, mailed Jan. 15, 2020; ISA/CN (8 pages).
CHTTL: "Discussion on Multi-TRP/Panel transmission enhancements", 3GPP Draft; R1-1810815, 3rd Generation Partnership Project ( 3GPP), Mobile Competence Centre ; 650, Route Des Lucioles ; F-06921 Sophia-Antipolis Cedex France vol. RAN WG1, No. Chengdu, China; Oct. 8, 2018-Oct. 12, 2018 Sep. 28, 2018 ( Sep. 28, 2018), XP051518220, Retrieved from the Internet: URL:http://www.3gpp.org/ftp/tsg%5Fran/WG1%5FRL1/TSGR1%5F94b/Docs/R1%2D1810815%2Ezip [retrieved on Sep. 28, 2018].
CMCC: "Discussion on DL multi-TRP transmission", 3GPP Draft; R1-1811048, 3rd Generation Partnership Project ( 3GPP), Mobile Competence Centre ; 650, Route Des Lucioles ; F-06921 Sophia-Antipolis Cedex France vol. RAN WG1, No. Chengdu, China; Oct. 8, 2018-Oct. 12, 2018 Sep. 29, 2018 ( Sep. 29, 2018), XP051518450, Retrieved from the Internet: URL:http://www.3gpp.org/ftp/tsg%5Fran/WG1%5FRL1/TSGR1%5F94b/Docs/R1%2D1811048%2Ezip [retrieved on Sep. 29, 2018].
Extended European Search Report mailed Jun. 29, 2022, in corresponding European Application No. 19879642.7.
Huawei et al: "Enhancements on multi-TRP/panel transmission in NR", 3GPP Draft; R1-1809117, 3rd Generation Partnership Project ( 3GPP), Mobile Competence Centre ; 650, Route Des Lucioles ; F-06921 Sophia-Antipolis Cedex France vol. RAN WG1, No. Gothenburg, Sweden; Aug. 20, 2018-Aug. 24, 2018 Aug. 11, 2018 ( Aug. 11, 2018), pp. 1-10, XP051516486, Retrieved from the Internet: URL:http://www.3gpp.org/ftp/tsg%5Fran/WG1%5FRL1/TSGR1%5F94/Docs/R1%2D1809117%2Ezip [retrieved on Aug. 11, 2018].
Huawei, HiSilicon and Remaining detailsofQCL assumptions [online] and 3GPP TSG RANWG1 #91 R1-1719443, Internet<URL:http://www.3gpp.org/ftp/tsg_ran/WG1_RL1/TSGR1_91/Docs/R1-1719443.zip>, Nov. 17, 2017.
Intel Corporation and Discussion on multi-TRP/multi-paneltransmission [online] and 3GPP TSG RAN WG1 #94b R1-1810790, Internet<URL:http://www.3gpp.org/ftp/tsg_ran/WG1_RL1/TSGR1_94 b/Docs/R1-1810790.zip>, Sep. 29, 2018.
Office Action mailed Jul. 14, 2022, in corresponding Korean Application No. 10-2021-7016430.
Office Action mailed Jul. 25, 2022, in corresponding Japanese Application No. 2021-523302.
Qualcomm Incorporated: "Multi-TRP Enhancements", 3GPP Draft; R1-1900905 Multi-TRP Enhancements, 3rd Generation Partnership Project ( 3GPP), Mobile Competence Centre ; 650, Route Des Lucioles ; F-06921 Sophia-Antipolis Cedex ; France vol. RAN WG1, No. Taipei, Taiwan; Jan. 21, 2019-Jan. 25, 2019 Jan. 12, 2019 ( Jan. 12, 2019), pp. 1-26, XP051576442, Retrieved from the Internet: URL: http://www.3gpp.org/ftp/tsg%5Fran/WG1% 5FRL1/TSGR1%5FAH/NR%5FAi%5F1901/Docs/R1%2D1900905%2Ezip.
ZTE: "Enhancements on mult-TRP transmission and reception", 3GPP Draft; R1-1808202 Enhancements on Multi-TRP Transmission and Reception, 3rd Generation Partnership Project ( 3GPP), Mobile Competence Centre ; 650, Route Des Lucioles ; F-06921 Sophia-Antipolis Ce vol. RAN WG1, No. Gothenburg, Sweden; Aug. 20, 2018-Aug. 24, 2018 Aug. 11, 2018 ( Aug. 11, 2018), XP051515587, Retrieved from the Internet: URL:http://www.3gpp.org/ftp/tsg%5Fran/WG1%5FRL1/TSGR1%5F94/Docs/R1%2D1808202%2Ezip.

* cited by examiner

METHOD FOR OBTAINING TRANSMISSION RECEPTION POINT INFORMATION, USER TERMINAL, AND READABLE STORAGE MEDIUM

CROSS-REFERENCE TO RELATED APPLICATIONS

This application is the national phase of International Application No. PCT/CN2019/112907, filed on Oct. 24, 2019, and claims the benefit of priority to Chinese Patent Application No. 201811294289.7, filed on Nov. 1, 2018, and entitled "METHOD FOR OBTAINING TRANSMISSION RECEPTION POINT INFORMATION, USER TERMINAL, AND READABLE STORAGE MEDIUM", the entire disclosure disclosures of each of the above applications are which is incorporated herein by reference.

TECHNICAL FIELD

The present disclosure generally relates to wireless communication technology field, and more particularly, to a method for obtaining a transmission reception point information, a user terminal and a readable storage medium.

BACKGROUND

In New Radio (NR) R15, only single Transmission Reception Point (single TRP) transmission is supported, so a transmitted Downlink Control Information (DCI) only includes one Transmission Configuration Indication (TCI), and the TCI is only associated with a Reference Signal grouping (RS grouping) RS Quasi Co-Located (QCL) configuration.

In NR R16, multi-TRP transmission is certainly supported, that is, one DCI includes multiple QCL configurations corresponding to the multiple TRPs. In a transmission process, the transmission scheme is also dynamically changing with channel environment, that is, the single TRP transmission scheme and the multi-TRP transmission scheme are dynamically switching. However, the dynamic switching of the two transmission schemes cannot be supported in the prior art.

SUMMARY

Embodiments of the present disclosure may provide a solution on how to support dynamic switching between a single TRP transmission scheme and a multi-TRP transmission scheme.

In an embodiment of the present disclosure, a method for obtaining a transmission reception point information is provided, including: receiving a control information which is adapted to trigger a signal or a channel; obtaining a Transmission Configuration Indication (TCI) comprised in the control information; and obtaining, according to the TCI, a TRP which participates in transmitting the signal or the channel triggered by the control information.

Optionally, a number of the TCI included in the control information is one, where the TCI comprises multiple Reference Signal (RS) groupings, and each RS grouping has a corresponding TRP; and wherein obtaining, according to the TCI, a TRP which participates in transmitting the signal or the channel triggered by the control information includes: detecting whether a Quasi Co-Located (QCL) configuration corresponding to each RS grouping meets a preset condition; and when a QCL configuration corresponding to a first RS grouping does not meet the preset condition, determining that a TRP corresponding to the first RS grouping participates in transmitting the signal or the channel triggered by the control information.

Optionally, obtaining, according to the TCI, a TRP which participates in transmitting the signal or the channel triggered by the control information further includes: when the QCL configuration corresponding to the first RS grouping meets the preset condition, determining that the TRP corresponding to the first RS grouping does not participate in transmitting the signal or the channel triggered by the control information.

Optionally, a number of the TCI comprised in the control information is more than one, and each TCI has a corresponding TRP; and wherein obtaining, according to the TCI, a TRP which participates in transmitting the signal or the channel triggered by the control information includes: detecting whether a value of a first TCI comprised in the control information is a preset value; and when the value of the first TCI is equal to the preset value, determining that a TRP corresponding to the first TCI does not participate in transmitting the signal or the channel triggered by the control information.

Optionally, obtaining, according to the TCI, a TRP which participates in transmitting the signal or the channel triggered by the control information further includes: when a value of any TCI comprised in the control information is not equal to the preset value, determining that a TRP corresponding to the TCI that has a value not equal to the preset value participates in transmitting the signal or the channel triggered by the control information.

Optionally, the control information is a downlink control information.

In an embodiment of the present disclosure, a user terminal is provided, including: a receiving unit, adapted to receive a control information which is adapted to trigger a signal or a channel; a TCI obtaining unit, adapted to obtain a TCI comprised in the control information; and a TRP obtaining unit, adapted to, according to the TCI, a TRP which participates in transmitting the signal or the channel triggered by the control information.

Optionally, a number of the TCI comprised in the control information is one, where the TCI comprises multiple RS groupings, and each RS grouping has a corresponding TRP; and wherein the TRP obtaining unit is adapted to detect whether a QCL configuration corresponding to each RS grouping meets a preset condition, and when a QCL configuration corresponding to a first RS grouping does not meet the preset condition, to determine that a TRP corresponding to the first RS grouping participates in transmitting the signal or the channel triggered by the control information.

Optionally, the TRP obtaining unit is further adapted to, when the QCL configuration corresponding to the first RS grouping meets the preset condition, determine that the TRP corresponding to the first RS grouping does not participate in transmitting the signal or the channel triggered by the control information.

Optionally, a number of the TCI comprised in the control information is more than one, and each TCI has a corresponding TRP; and wherein the TRP obtaining unit is further adapted to detect whether a value of a first TCI comprised in the control information is a preset value, and when the value of the first TCI is equal to the preset value, to determine that a TRP corresponding to the first TCI does not participate in transmitting the signal or the channel triggered by the control information.

Optionally, the TRP obtaining unit is further adapted to, when a value of any TCI comprised in the control information is not equal to the preset value, determine that a TRP corresponding to the TCI that has a value not equal to the preset value participates in transmitting the signal or the channel triggered by the control information.

Optionally, the control information is a downlink control information.

In an embodiment of the present disclosure, a readable storage medium having computer instructions stored therein, wherein the readable storage medium is a non-volatile storage medium or a non-transitory storage medium, and once the computer instructions are executed, the above method for obtaining a TRP information is performed.

In an embodiment of the present disclosure, a user terminal including a memory and a processor is provided, wherein the memory has computer instructions stored therein, and when the processor executes the computer instructions, the above method for obtaining a TRP information is performed.

Embodiments of the present disclosure may provide following advantages.

In embodiments of the present disclosure, according to the TCI included in the control information, the TRP that participates in transmitting the signal or channel triggered by the control information is obtained. In other words, the TRP is obtained according to the TCI included in the control information. Therefore, whether in a single TRP transmission scheme or a multi-TRP transmission scheme, the corresponding TCI can be obtained, so as to obtain the TRP, thereby realizing dynamic switching between the two transmission schemes.

DETAILED DESCRIPTION

As described in the background, in a transmission process, the transmission scheme is also dynamically changing with channel environment, that is, the single TRP transmission scheme and the multi-TRP transmission scheme are dynamically switching. However, the dynamic switching of the two transmission schemes cannot be supported in prior art.

In embodiments of the present disclosure, a TRP is obtained according to a TCI included in a control information. Therefore, whether in a single TRP transmission scheme or a multi-TRP transmission scheme, a corresponding TCI can be obtained, so as to obtain the TRP, thereby realizing dynamic switching between the two transmission schemes.

In order to clarify the object, characteristic and advantages of embodiments of the present disclosure, embodiments of present disclosure will be described clearly in detail in conjunction with accompanying drawings.

Figure 1:
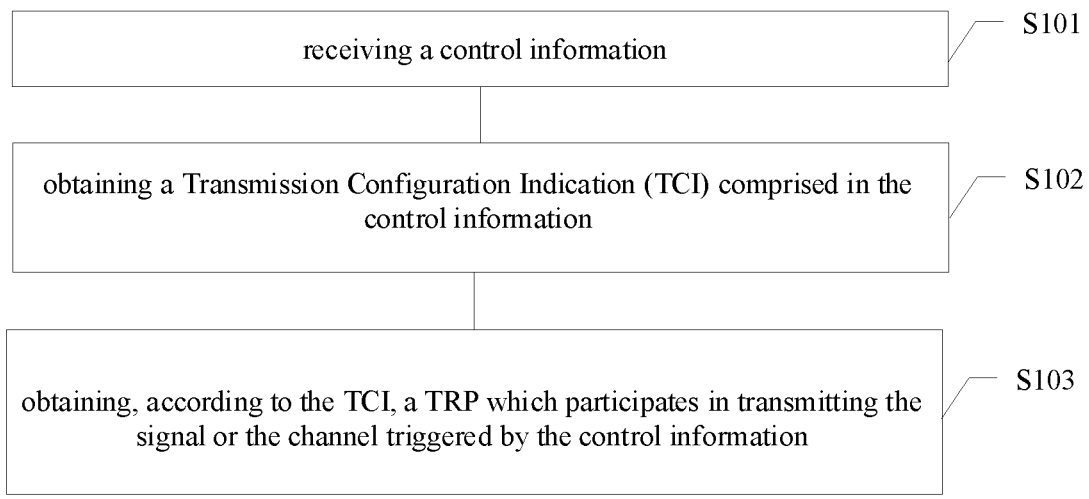
FIG. 1 schematically illustrates a flow chart of a method for obtaining a transmission reception point information according to an embodiment.

In an embodiment of the present disclosure, a method for obtaining a TRP information is provided. Referring to FIG. 1, the method includes S101 to S103.

In S101, a control information is received.

In some embodiments, a base station may send the control information to a user terminal, in which a Transmission Configuration Indication (TCI) may be included. The base station may send the control information to the user terminal based on a Radio Resource Control (RRC) configuration. The control information sent by the base station may be adapted to trigger a signal or a channel. The channel triggered by the control information may include: a Physical Downlink Shared Channel (PDSCH), a Physical Uplink Control Channel (PUCCH), etc. The signal triggered by the control information may include: a Sounding Reference Signal (SRS), a Channel State Information Reference Signal (CSI-RS), etc.

In some embodiments, the control information sent by the base station to the user terminal is a downlink control information.

In S102, the TCI included in the control information is obtained.

In some embodiments, the base station may configure the TCI in the control information. After receiving the control information, the user terminal may obtain the TCI from the control information.

In S102, according to the TCI, a TRP which participates in transmitting the signal or the channel triggered by the control information is obtained.

In some embodiments, a number of the TCI comprised in the control information is one, where the TCI includes multiple Reference Signal (RS) groupings, and each RS grouping has a corresponding TRP.

In some embodiments, a mapping relationship between the multiple RS groupings and the corresponding TRPs may be defined in advance, and each RS grouping has a corresponding TRP. A QCL configuration associated with each RS grouping may be a QCL configuration corresponding to the corresponding TRP.

For example, if a first RS grouping is defined in advance to correspond to a first TRP, a QCL configuration corresponding to the first TRP is a QCL configuration associated with the first RS grouping.

When a TCI is associated with multiple RS groupings, whether a QCL configuration corresponding to each RS grouping meets a preset condition is detected. When a QCL configuration corresponding to a first RS grouping does not meet the preset condition, that a TRP corresponding to the first RS grouping participates in transmitting the signal or the channel triggered by the control information is determined. Otherwise, when the QCL configuration corresponding to the first RS grouping meets the preset condition, that the TRP corresponding to the first RS grouping does not participate in transmitting the signal or the channel triggered by the control information is determined.

In some embodiments, when a QCL configuration corresponding to a RS grouping meets the preset condition, that the QCL configuration corresponding to the RS grouping is determined to be an invalid configuration. Specifically, when the QCL configuration does not conform to an existing protocol specification, the QCL configuration associated with the RS grouping is determined to be an invalid configuration; or, when the QCL configuration corresponding to the RS grouping is empty, the QCL configuration associated with the RS grouping is determined to be an invalid configuration.

In some embodiments, a number of the TCI comprised in the control information is more than one, and each TCI is associated with one or more RS groupings.

In some embodiments, a mapping relationship between the multiple TCIs and TRPs may be defined in advance, and each TCI corresponds to a TRP. When the control information includes multiple TCIs, whether a value of each TCI is a preset value is detected. In some embodiments, when a value of a first TCI is equal to the preset value, that a TRP corresponding to the first TCI does not participate in transmitting the signal or the channel triggered by the control information is determined; otherwise, when the value of the first TCI is not equal to the preset value, that a TRP corresponding to the first TCI participates in transmitting the signal or the channel triggered by the control information is determined.

In some embodiments, using a RS grouping to configure a QCL configuration corresponding to a TRP includes: configuring a QCL configuration associated with the RS grouping as the QCL configuration corresponding to the TRP.

The method for obtaining a TRP information provided in the embodiments of the present disclosure described above will be illustrated in detail below.

For example, a DCI includes one TCI which is associated with two RS groupings, where a first RS grouping is used to configure a QCL corresponding to a first TRP, and a second RS grouping is used to configure a QCL corresponding to a second TRP.

When the QCL associated with the first RS grouping is detected not conform to an existing protocol specification, the user terminal determines that the first TRP does not participate in transmitting a signal or a channel triggered by the DCI. When the QCL associated with the first RS grouping is detected to conform to the existing protocol specification, the user terminal determines that the first TRP participates in transmitting the signal or the channel triggered by the DCI.

For another example, a DCI includes four TCIs and each TCI is associated with a TRP, where a first TCI is associated with a first TRP, a second TCI is associated with a second TRP, a third TCI is associated with a third TRP, and a fourth TCI is associated with a fourth TRP. If a preset value of the TCIs is 7, a TRP corresponding to a TCI whose value is 7, does not participate in transmitting a signal or a channel triggered by a control information.

After receiving the DCI sent by the base station, the user terminal decodes the DCI and learns that values of the third TCI and the fourth TCI are 7, then the user terminal determines that the first TRP corresponding to the first TCI and the second TRP corresponding to the second TCI participate in transmitting the signal or channel triggered by the control information, and the third TRP corresponding to the third TCI and the fourth TRP corresponding to the fourth TCI do not participate in transmitting the signal or channel triggered by the control information.

Figure 2:
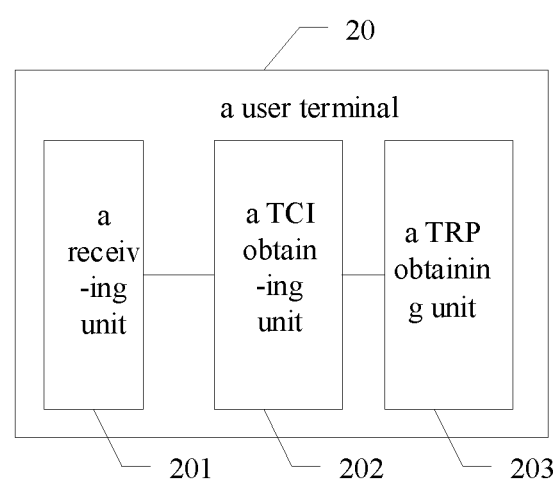
FIG. 2 schematically illustrates a structural diagram of a user terminal according to an embodiment.

FIG. 2 schematically illustrates a structural diagram of a user terminal according to an embodiment. Referring to FIG. 2, the user terminal includes: a receiving unit 201, a TCI obtaining unit 202 and a TRP obtaining unit 203.

Specifically, the receiving unit 201 is adapted to receive a control information which is adapted to trigger a signal or a channel.

Specifically, the TCI obtaining unit 202 is adapted to obtain a Transmission Configuration Indication (TCI) comprised in the control information.

Specifically, the TRP obtaining unit 203 is adapted to, according to the TCI, obtain a transmission reception point (TRP) which participates in transmitting the signal or the channel triggered by the control information.

In some embodiments, a number of the TCI comprised in the control information is one, where the TCI includes multiple RS groupings, and each RS grouping has a corresponding TRP. Specifically, the TRP obtaining unit 203 is adapted to detect whether a QCL configuration corresponding to each RS grouping meets a preset condition; and when a QCL configuration corresponding to a first RS grouping does not meet the preset condition, the TRP obtaining unit 203 is adapted to determine that a TRP corresponding to the first RS grouping participates in transmitting the signal or the channel triggered by the control information.

In some embodiments, the TRP obtaining unit 203 is further adapted to, when the QCL configuration corresponding to the first RS grouping meets the preset condition, determine that the TRP corresponding to the first RS grouping does not participate in transmitting the signal or the channel triggered by the control information.

In some embodiments, a number of the TCI included in the control information is more than one, and each TCI has a corresponding TRP. Specifically, the TRP obtaining unit 203 is adapted to detect whether a value of a first TCI included in the control information is a preset value; and when the value of the first TCI is equal to the preset value, the TRP obtaining unit 203 is adapted to determine that a TRP corresponding to the first TCI does not participate in transmitting the signal or the channel triggered by the control information.

In some embodiments, the TRP obtaining unit 203 is further adapted to, when a value of any TCI comprised in the control information is not equal to the preset value, determine that a TRP corresponding to the TCI that has a value not equal to the preset value participates in transmitting the signal or the channel triggered by the control information.

In some embodiments, the control information is a downlink control information.

In an embodiment of the present disclosure, a computer readable storage medium having computer instructions stored therein is provided, where the computer readable storage medium is a non-volatile storage medium or a non-transitory storage medium, and once the computer instructions are executed, the method for obtaining a transmission reception point information is performed.

In an embodiment of the present disclosure, a user terminal having a memory and a processor is provided, wherein the memory has computer instructions stored therein, and when the processor executes the computer instructions, the above method for obtaining a transmission reception point information is performed.

Those skilled in the art can understand that all or part of the steps of the methods provided in the embodiments of the present disclosure can be performed by computer instructions in conjunction with relevant hardware. The computer instructions may be stored in a computer readable storage medium, which includes: a Read Only Memory (ROM), a Random Access Memory (RAM), a magnetic disk, an optical disk or the like.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for obtaining a transmission reception point (TRP) information, comprising:
   receiving a control information which is adapted to trigger a signal or a channel;
   obtaining a Transmission Configuration Indication (TCI) comprised in the control information; and obtaining, according to the TCI, a TRP which participates in transmitting the signal or the channel triggered by the control information;

wherein a number of the TCI comprised in the control information is one, wherein the TCI comprises multiple Reference Signal (RS) groupings, and each RS grouping has a corresponding TRP;

wherein said obtaining, according to the TCI, the TRP which participates in transmitting the signal or the channel triggered by the control information comprises:

detecting whether a Quasi Co-Located (QCL) configuration corresponding to each RS grouping meets a preset condition; and when a QCL configuration corresponding to a first RS grouping does not meet the preset condition, determining that a TRP corresponding to the first RS grouping participates in transmitting the signal or the channel triggered by the control information.

2. The method for obtaining a TRP information according to claim 1, wherein said obtaining, according to the TCI, the TRP which participates in transmitting the signal or the channel triggered by the control information further comprises:

in response to the QCL configuration corresponding to the first RS grouping meeting the preset condition, determining that the TRP corresponding to the first RS grouping does not participate in transmitting the signal or the channel triggered by the control information.

3. The method for obtaining a TRP information according to claim 2, wherein the control information is a downlink control information.

4. A readable storage medium having computer instructions stored therein, wherein the readable storage medium is a non-volatile storage medium or a non-transitory storage medium, and once the computer instructions are executed, the method according to claim 1 is performed.

5. A user terminal having a memory and a processor, wherein the memory has computer instructions stored therein, and when the processor executes the computer instructions, the above method according to claim 1 is performed.

6. A user terminal, comprising:

a receiving circuitry, adapted to receive a control information which is adapted to trigger a signal or a channel;

a TCI obtaining circuitry, adapted to obtain a Transmission Configuration Indication (TCI) comprised in the control information; and a TRP obtaining circuitry, adapted to, according to the TCI, obtain a transmission reception point (TRP) which participates in transmitting the signal or the channel triggered by the control information;

wherein a number of the TCI comprised in the control information is one, wherein the TCI comprises multiple Reference Signal (RS) groupings, and each RS grouping has a corresponding TRP; and wherein the TRP obtaining circuitry is further adapted to detect whether a Quasi Co-Located (QCL) configuration corresponding to each RS grouping meets a preset condition, and when a QCL configuration corresponding to a first RS grouping does not meet the preset condition, to determine that a TRP corresponding to the first RS grouping participates in transmitting the signal or the channel triggered by the control information.

7. The user terminal according to claim 6, wherein the TRP obtaining circuitry is further adapted to, in response to the QCL configuration corresponding to the first RS grouping meeting the preset condition, determine that the TRP corresponding to the first RS grouping does not participate in transmitting the signal or the channel triggered by the control information.

8. The user terminal according to claim 7, wherein the control information is a downlink control information.

\* \* \* \* \*